(12) United States Patent
Choi et al.

(10) Patent No.: US 10,304,085 B2
(45) Date of Patent: May 28, 2019

(54) ADVERTISEMENT SERVICE USING MOBILE VEHICLE

(71) Applicant: KT CORPORATION, Gyeonggi-do (KR)

(72) Inventors: Woo-Hyuk Choi, Seoul (KR); Seung-Kwon Lee, Gyeonggi-do (KR); Deok-Moon Chang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 904 days.

(21) Appl. No.: 14/190,305

(22) Filed: Feb. 26, 2014

(65) Prior Publication Data
US 2014/0244385 A1     Aug. 28, 2014

(30) Foreign Application Priority Data
Feb. 26, 2013 (KR) .......................... 10-2013-0020507

(51) Int. Cl.
    *G06Q 30/02* (2012.01)
(52) U.S. Cl.
    CPC ..... *G06Q 30/0261* (2013.01); *G06Q 30/0254* (2013.01); *G06Q 30/0269* (2013.01)
(58) Field of Classification Search
    CPC .................................................. G06Q 30/0261
    See application file for complete search history.

(56) References Cited

U.S. PATENT DOCUMENTS

| 4,084,339 | A | * | 4/1978 | Peltier | ............... | G09F 13/16 |
| | | | | | | 353/97 |
| 6,006,159 | A | * | 12/1999 | Schmier | ............... | G08G 1/123 |
| | | | | | | 340/988 |
| 6,060,993 | A | * | 5/2000 | Cohen | ............... | B60Q 1/50 |
| | | | | | | 340/425.5 |
| 6,414,602 | B2 | * | 7/2002 | Polyakov | ............... | G06Q 30/02 |
| | | | | | | 340/691.6 |
| 6,701,143 | B1 | * | 3/2004 | Dukach | ............... | G08G 1/127 |
| | | | | | | 455/414.1 |

(Continued)

FOREIGN PATENT DOCUMENTS

| KR | 10-0646232 B1 | 11/2006 |
| KR | 10-2009-0055541 A | 6/2009 |

(Continued)

OTHER PUBLICATIONS

Dwivedi et al., "Advanced Advertising Technique in India Public Transport System: A Better Way to Disseminate Information Using Electronic Display," 2013 International Conference on Human Computer Interactions (ICHCI), Aug. 23-24, 2013, IEEE, all pages. (Year: 2013).*

(Continued)

*Primary Examiner* — Jacob C. Coppola
(74) *Attorney, Agent, or Firm* — IP Legal Services, LLC

(57) ABSTRACT

The disclosure is related to an advertisement service using mobile vehicles. Particularly, the disclosure relates to providing advertisement content selected based on statistical information on an advertisement target at an advertisement display location. Furthermore, the selected advertisement content may be provided to a corresponding mobile vehicle before the corresponding mobile vehicle arrives at the advertisement display location.

6 Claims, 7 Drawing Sheets

(56) References Cited

U.S. PATENT DOCUMENTS

| | | | | |
|---|---|---|---|---|
| 6,803,862 | B2* | 10/2004 | O'Connor | G08G 1/123 340/989 |
| 6,850,209 | B2* | 2/2005 | Mankins | B60Q 1/2611 340/469 |
| 6,898,517 | B1* | 5/2005 | Froeberg | G06Q 30/02 340/691.6 |
| 6,922,138 | B2* | 7/2005 | Melvin | G06Q 30/02 340/438 |
| 7,449,998 | B1* | 11/2008 | Au | B60Q 1/2611 340/468 |
| 7,643,658 | B2* | 1/2010 | Kilner | G06K 9/00221 382/103 |
| 7,882,653 | B2* | 2/2011 | Barlow | G06Q 30/02 40/531 |
| 7,930,204 | B1* | 4/2011 | Sharma | G06Q 30/02 705/7.32 |
| 9,147,192 | B2* | 9/2015 | Dawson | G06Q 30/00 |
| 2002/0032035 | A1* | 3/2002 | Teshima | G06Q 30/02 455/456.3 |
| 2004/0192351 | A1* | 9/2004 | Duncan | G06Q 30/02 455/456.3 |
| 2005/0021393 | A1* | 1/2005 | Bao | G06Q 30/02 705/14.64 |
| 2005/0030735 | A1* | 2/2005 | Wang | B60Q 1/2615 362/84 |
| 2005/0177416 | A1* | 8/2005 | Linden | G01S 19/14 705/14.62 |
| 2007/0019162 | A1* | 1/2007 | Gomez de Llarena | G03B 15/006 353/13 |
| 2008/0034388 | A1* | 2/2008 | Majidi | G06Q 30/02 725/37 |
| 2008/0098305 | A1* | 4/2008 | Beland | G06F 3/0482 715/719 |
| 2009/0010499 | A1* | 1/2009 | Cermeno Mediavilla | G06K 9/00241 382/118 |
| 2009/0076915 | A1* | 3/2009 | Tighe | G06Q 30/02 705/14.62 |
| 2009/0150242 | A1* | 6/2009 | Del Cogliano | G06Q 30/0265 705/14.62 |
| 2009/0299857 | A1* | 12/2009 | Brubaker | G06Q 30/02 705/14.66 |
| 2011/0016483 | A1* | 1/2011 | Opdycke | G06Q 30/02 725/14 |
| 2012/0130818 | A1* | 5/2012 | Katsuki | G06Q 30/0261 705/14.58 |
| 2013/0013412 | A1* | 1/2013 | Altman | G09F 21/04 705/14.61 |
| 2013/0018714 | A1* | 1/2013 | George | G06Q 30/0277 705/14.16 |
| 2013/0138508 | A1* | 5/2013 | Gee | H04W 4/021 705/14.58 |
| 2014/0040016 | A1* | 2/2014 | Amla | G09F 21/04 705/14.45 |
| 2014/0052537 | A1* | 2/2014 | Garnet | B61L 15/009 705/14.63 |
| 2014/0232702 | A1* | 8/2014 | Needham | G09G 3/20 345/204 |
| 2014/0344451 | A1* | 11/2014 | Luft | H04W 4/70 709/224 |

FOREIGN PATENT DOCUMENTS

| | | |
|---|---|---|
| KR | 10-2009-0100142 A | 9/2009 |
| KR | 10-2012-0003798 A | 1/2012 |
| KR | 10-2012-0052150 A | 5/2012 |

OTHER PUBLICATIONS

Fang et al., "A Novel System for Interactive Mobile Multimedia Service in Public Transports," 2013 3rd Conference on Computer Science and Network Technology, IEEE, all pages. (Year: 2013).*

* cited by examiner

ADVERTISEMENT SERVICE USING MOBILE VEHICLE

CROSS REFERENCE TO PRIOR APPLICATIONS

The present application claims priority under 35 U.S.C. § 119 to Korean Patent Application No. 10-2013-0020507 (filed on Feb. 26, 2013), which is hereby incorporated by reference in its entirety.

TECHNICAL FIELD

The present disclosure relates to an advertisement service, in particular, to providing an advertisement service using mobile vehicles.

BACKGROUND

A mobile vehicle, such as bus or taxi, is a form of public transportation many people use. If displaying an advertisement on such mobile vehicle, a higher advertisement effect may be expected. In the past, an advertisement method of printing and attaching an advertisement phrase to an inside or outside of a mobile vehicle has been used. Recently, a video advertisement method has been used. In such video advertisement method, a video player, such as a digital signage, is installed in an inside or an outside of a mobile vehicle, and advertisement contents are delivered to advertisement audiences inside and outside the mobile vehicle by projecting a video advertisement using the video player.

However, such advertisement method may not yield high advertisement effect because the advertisement contents are provided to many and unspecified persons in an indiscriminate manner, regardless of a location of the mobile vehicle.

In order to improve advertisement effect, an advertisement method using a GPS satellite has been provided. Such advertisement method receives location information (e.g., latitude and longitude coordinates) of a mobile vehicle from a GPS satellite, and provides an advertisement associated with the location of the mobile vehicle. For example, such advertisement method may obtain a location of a mobile vehicle (e.g., bus) using a GPS, and provide an advertisement associated with the location of the mobile vehicle. However, such method merely provides an advertisement varying according to a service location (or service area) of a mobile vehicle. Accordingly, it may be difficult to provide an efficient advertisement and to expect a high advertisement effect.

The typical advertisement methods described above do not consider advertisement audiences (e.g., passengers who wait for bus) standing at a location (e.g., bus stop) where an advertisement is to be displayed, and therefore, have a limitation to an advertisement effect. For example, even in the case that passengers waiting at a bus stop are mainly men, an advertisement of female cosmetics may be displayed on an advertisement display device installed outside a bus. For another example, even in the case that passengers waiting at a bus stop are mainly elderly people, an advertisement of toys for children may be displayed. In such cases, an advertisement effects are low.

Furthermore, a plurality of mobile vehicles (e.g., buses) having an advertisement display device might stop at the same location (e.g., bus stop) at regular intervals. In this case, if the same advertisement is continuously displayed, advertisement audiences (passengers waiting at a bus stop) may lose interest in the advertisement, thereby resulting in a reduction in an advertisement effect.

SUMMARY

This summary is provided to introduce a selection of concepts in a simplified form that is further described below in the detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an advertisement service may be provided using mobile vehicles. Particularly, advertisement contents to be displayed at the mobile vehicles may be selected based on statistical information on a corresponding advertisement target (e.g., a corresponding advertisement audience). The advertisement target information may include at least one of the number of advertisement audience members, a gender ratio of the advertisement audience, and an age ratio of the advertisement audience.

In accordance with an embodiment of the present invention, a method may provide an advertisement service in an advertisement server. The method may include obtaining information on an advertisement target at an advertisement display location, selecting advertisement content for display at the advertisement display location, based on the advertisement target information, and transmitting the selected advertisement content to a corresponding mobile vehicle traveling toward the advertisement display location, wherein the corresponding mobile vehicle includes an advertisement display apparatus.

The advertisement target information may include at least one of the number of advertisement audiences corresponding to the advertisement target, a gender ratio of the advertisement audiences, and an age ratio of the advertisement audiences.

The obtaining may include receiving the advertisement target information from at least one of (i) an advertisement target information collection apparatus located at the advertisement display location, and (ii) a different advertisement display apparatus of a different mobile vehicle located at the advertisement display location.

The obtaining may include receiving image data of the advertisement target, from at least one of (i) an advertisement target information collection apparatus located at the advertisement display location, and (ii) a different advertisement display apparatus of a different mobile vehicle located at the advertisement display location, and extracting the advertisement target information by analyzing the image data.

The method may further include transmitting display control information associated with the selected advertisement content to the corresponding mobile vehicle.

The display control information may include at least one of (i) display start location information (ii) the number of display repetitions, and (iii) display start time information The method may further include receiving information on a current advertisement content being displayed on a different advertisement display apparatus of a different mobile vehicle located at the advertisement display location, from the different advertisement display apparatus.

The advertisement content may be selected as a series advertisement content associated with the current advertisement content of the different advertisement display apparatus.

In a case that the corresponding mobile vehicle is a transportation vehicle, the advertisement display location may be a specific station, and the advertisement target may be one or more transportation service users waiting for the transportation vehicle at the specific station.

At least one of the selecting and the transmitting may be performed when an advertisement request message is received from the corresponding mobile vehicle.

The advertisement request message may include at least one of identification information, current location information and travelling direction information, associated with the corresponding mobile vehicle.

In accordance with an embodiment of the present invention, a method may provide an advertisement service in an advertisement display apparatus of a mobile vehicle. The method may include transmitting a request message to collect information on an advertisement target at an advertisement display location, to at least one information collection apparatus, before the mobile vehicle arrives at the advertisement display location, receiving advertisement information including advertisement content for display at the advertisement display location, from an advertisement server, wherein the advertisement content is selected based on the advertisement target information, and displaying the advertisement content.

The transmitting may include determining entry of a mobile vehicle to a predetermined zone of the advertisement display location, and broadcasting the request message to obtain the advertisement target information when the mobile vehicle enters the predetermined zone of the advertisement display location.

The advertisement information may further include display control information associated with the advertisement content. The display control information may include at least one of (i) display start location information (ii) the number of display repetitions, and (iii) display start time information.

The displaying may be performed according to the display control information.

The receiving may include transmitting an advertisement request message to the advertisement server, and receiving the advertisement content from the advertisement server, in response to the advertisement request message.

Each of the information collection request message and the advertisement request message may include at least one of identification information, current location information, and traveling direction information associated with the mobile vehicle.

In accordance with an embodiment of the present invention, a method may be provided for collecting an advertisement target information in at least one of an advertisement target information collection apparatus and an advertisement display apparatus of a mobile vehicle located at an advertisement display location. The method may include collecting image data of an advertisement target at the advertisement display location, obtaining statistical information on the advertisement target by analyzing the image data, and transmitting the statistical information to an advertisement server.

The collecting the image data may be performed at least one of (i) at a determined time period and (ii) when an advertisement target information collection request is received from a mobile vehicle including an advertisement display apparatus.

The statistical information may include at least one of the number of advertisement audiences corresponding to the advertisement target, a gender ratio of the advertisement audiences, and an age ratio of the advertisement audiences.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
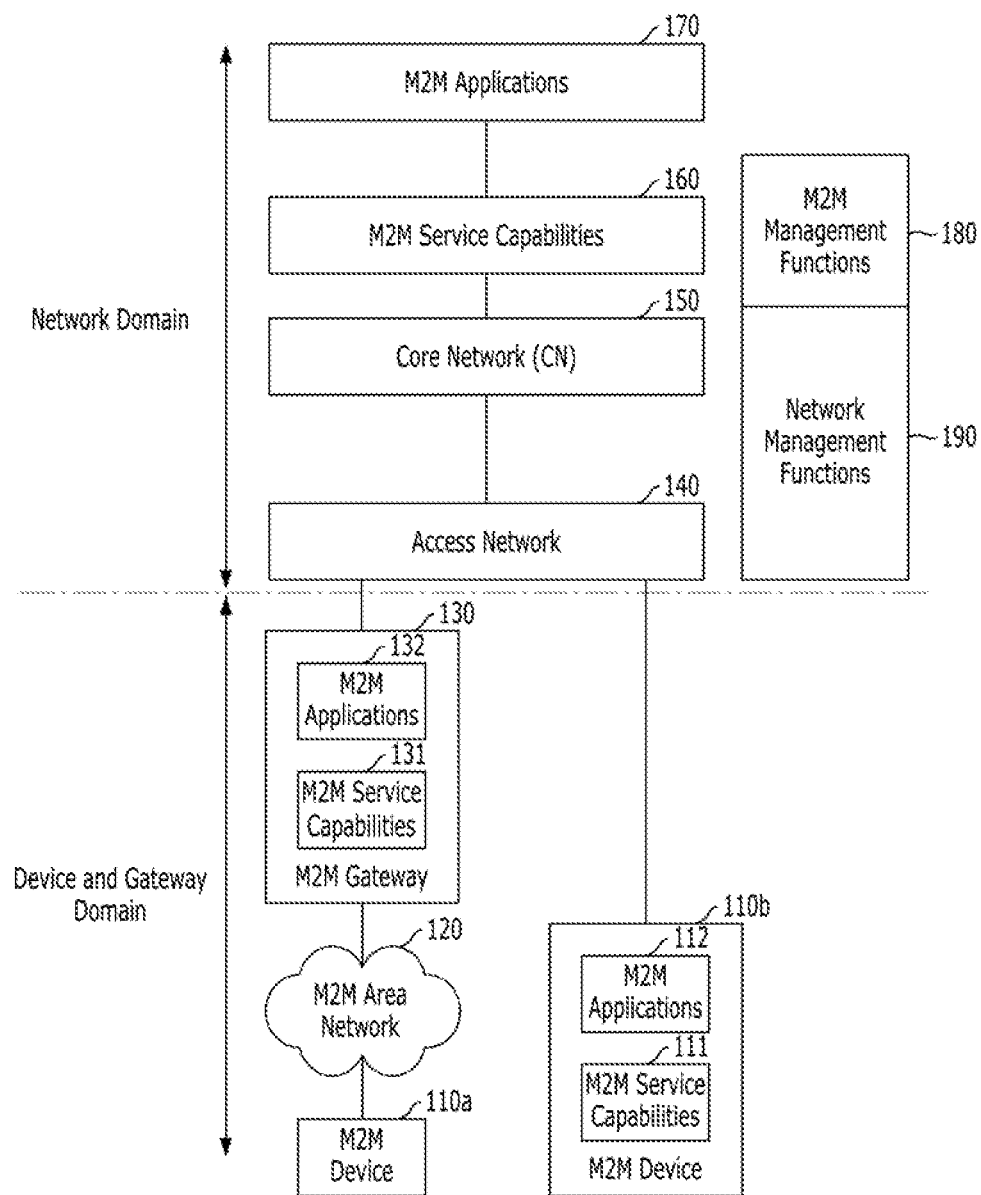
FIG. 1 illustrates a typical architecture for M2M services according to the ETSI standard.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may provide an advertisement service using mobile vehicles having an advertisement display device. Particularly, advertisement contents to be displayed at the mobile vehicles may be selected based on statistical information on a corresponding advertisement target (e.g., an advertisement audience). Herein, the advertisement target information may include at least one of the number of advertisement audience members, a gender ratio of the advertisement audience, and an age ratio of the advertisement audience.

More specifically, the present embodiment may select relatively optimal advertisement content based on information on an advertisement target at an advertisement display location, and provide the selected advertisement content to a corresponding mobile vehicle traveling toward the advertisement display location.

An advertisement service system according to the present embodiment may be implemented based on an M2M communication system. An M2M communication is an object-to-object communication. Therefore, the M2M communication may have different characteristics from a human-to-human (H2H) communication. Essential techniques may be changed due to such difference of characteristics. Necessary characteristics may be changed according to use fields of the M2M communication. Standard groups of all the countries of the world, including ETSI (European Telecommunication Standard Institute), have conducted research and development for successful M2M communication standardization.

FIG. 1 illustrates a typical architecture for M2M services according to the ETSI standard.

Referring to FIG. 1, M2M devices 110a and 110b are terminals that perform communication without human intervention or in a state in which human intervention is minimized. In particular, M2M devices 110 and 110b may refer to any type of devices that send and forward data stored therein, in response to an external request or automatically. An advertisement display apparatus installed in a mobile vehicle according to the present embodiment may correspond to M2M device 110a or 110b.

According to the ETSI standard, in the case that M2M device 110b directly connects to access network 140, M2M device 110b may run M2M applications 112 using M2M service capabilities (SCs) 111. Herein, the M2M applications 112 may be referred to as "device applications (DAs)." Meanwhile, M2M device 110a may connect to access network 140 via M2M gateway 130. In this case, M2M device 110a may use M2M service capabilities (SCs) 131 of M2M gateway 130.

M2M area network 120 may provide connectivity between M2M device 110a and M2M gateway 130. For example, M2M area network 120 may include a personal area network (PAN) and/or a local area network (LAN), but is not limited thereto. The PAN may include IEEE 802.15.x, Zigbee, Bluetooth, IETF ROLL, ISA100.11a, and so forth. The LAN may include PLC, M-BUS, Wireless M-BSU, KNX, and so forth.

M2M gateway 130 may run M2M applications 132 using M2M service capabilities (SCs) 131. Herein, M2M applications 132 may be referred to as "gateway applications (GAs)." M2M gateway 130 may act as a proxy between M2M device 110a and access network 140.

Access network 140 may allow M2M device 110b and/or M2M gateway 130 to communicate with core network (CN) 150. For example, access network 140 may include an xDSL network, a hybrid fiber coaxial (HFC) network, a FTTH network, a PLC network, a satellite network, GERAN, UTRAN, eUTRAN, Wireless LAN, and/or a WiMAX (WiBro) network, but is not limited thereto.

Core network (CN) 150 may provide IP connectivity, an access network control, network/service control functions, an interconnection with other networks, roaming functions, and so forth. For example, core network 150 may include 3GPP CN, ETSI TISPAN CN, 3GPP2 CN, and/or IP multimedia subsystem (IMS), but is not limited thereto.

M2M service capabilities (SCs) 160 in a network domain may provide functions that are to be shared by different applications, and environments that allow access to other service capabilities through open interfaces. The use of such M2M service capabilities may make it possible to develop and deploy optimized applications without considering characteristics of lower network layers.

M2M applications 170 of the network domain may run an M2M service logic and use M2M service capabilities through an open interface provided in the M2M system. Herein, M2M applications 170 may be referred to as "network applications (NAs)."

Referring to FIG. 1, the network domain may include M2M management functions 180 and network management functions 190. M2M management functions 180 may include all the functions required to manage M2M service capabilities 160 in the network domain. The management of the M2M devices (e.g., 110a, 110b) and the M2M gateways (e.g., 130) may use a specific M2M service capability. Network management functions 190 may include all the functions required to manage access network 140 and core network 150. Network management functions 190 may include a variety of functions such as a provisioning, supervision, fault management, and so forth.

According to the ETSI standard, M2M service capabilities 160 in the network domain may be referred to as a network service capabilities layer (NSCL). M2M service capabilities 131 in M2M gateway 130 may be referred to as a gateway service capabilities layer (GSCL). M2M service capabilities (e.g., 111) in M2M devices (e.g., 110a, 110b) may be referred to as a device service capabilities layer (DSCL). NSCL 160, GSCL 131, and DSCL 111 may be collectively referred to as a service capabilities layer (SCL). NSCL 160 may refer to individual platforms established for services by M2M service providers. Herein, NSCL 160 may be a platform which is individually implemented per each service by an M2M service provider. In the present embodiment, a specific server providing a specific service may correspond to NSCL 160.

Figure 2:
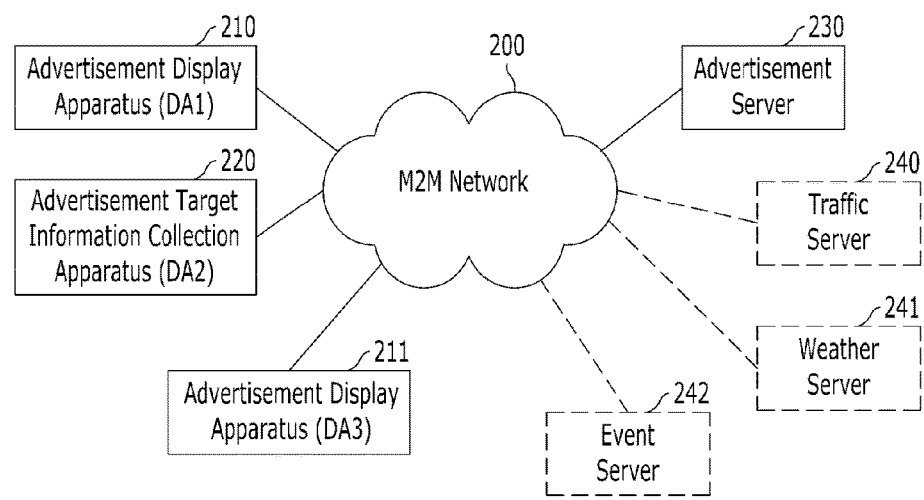
FIG. 2 illustrates an architecture of an advertisement service system using a mobile vehicle in accordance with at least one embodiment.

FIG. 2 illustrates an architecture of an advertisement service system using a mobile vehicle in accordance with at least one embodiment.

As shown in FIG. 2, an advertisement service system in accordance with at least one embodiment may include one or more advertisement display apparatuses 210 and 211, advertisement target information collection apparatus 220 installed at an appropriate location of a station (e.g., a bus stop), M2M network 200, and advertisement server 230. The advertisement service system may further include at least one of traffic server 240, weather server 241, and event server 242. In the present specification, mobile vehicles may represent a variety of moving objects including a form of transportation (e.g., a car, a bus, a taxi, a subway, a ship, etc.).

M2M network 200 may refer to a network complying with the ETSI standard as described above. As shown in FIG. 1, a detailed configuration of M2M network 200 may include a plurality of network entities.

Advertisement display apparatuses 210 and 211 may be installed in mobile vehicles (e.g., buses, subways, etc.) continuously entering the station (e.g., bus stop) where an advertisement target (i.e., an advertisement audience, for example, passengers waiting for a bus at a bus stop). Advertisement display apparatus 210 may be a device installed in (e.g., mounted on) a mobile vehicle that enters a station (e.g., a bus stop) within a predetermined distance. Advertisement display apparatus 211 may be a device installed in (e.g., mounted on) another mobile vehicle that stops to take or leave passengers at the station (e.g., bus stop) before the mobile vehicle mounted with advertisement display apparatus 210 enters the station (e.g., bus stop). Each of advertisement display apparatuses 210 and 211 may include a display processor (e.g., 34) and an advertisement target information collection processor (e.g., 30). The display processor (e.g., 34) may display advertisement content received from advertisement server 230 to the advertisement audiences (e.g., waiting passengers) at the outside of the mobile vehicle. The display processor (e.g., 34) may include a display unit such as a digital signage on which advertisement content is displayed. The advertisement target information collection processor (e.g., 30) may include at least one camera, or the like. The advertisement target information collection processor (e.g., 30) may collect information on advertisement audiences (e.g., waiting passengers) at the outside of the mobile vehicle (in particular, in the vicinity of the station (e.g., bus stop)). The structure of advertisement display apparatuses 210 and 211 will be described in detail with reference to FIG. 3.

Advertisement target information collection apparatus 220 may be installed at a station (e.g., a bus stop) where a mobile vehicle such as a bus takes or leaves the passengers, or an appropriate location around the station. Like advertisement display apparatuses 210 and 211, advertisement target information collection apparatus 220 may include an advertisement target information collection processor (e.g., 40) including at least one camera. Advertisement target information collection apparatus 220 may collect (or obtain) information on advertisement audiences (e.g., waiting passengers) in the vicinity of the station, and transmits the collected information to advertisement server 230.

Hereinafter, advertisement display apparatuses 210 and 211 and advertisement target information collection apparatus 220 may be referred to as device application (DA)1, device application (DA)3 and device application (DA)2 in the sense that device applications are implemented therein in terms of the ETSI standard as described above.

Advertisement server 230 may receive information on an advertisement target (i.e., an advertisement audience, e.g., waiting passengers) around a current station, from advertisement target information collection apparatus (DA2) 220 installed at an appropriate location around the station. Furthermore, advertisement server 230 may receive an advertisement target (i.e., an advertisement audience, e.g., waiting passengers) around a current station, from advertisement display apparatus (DA3) 211 installed in a mobile vehicle that is stopping to take or leave passengers at the station.

Meanwhile, advertisement server 230 may receive an advertisement update request message from advertisement display apparatuses (DA1) 210. Herein, the advertisement update request message may include at least one of (i) identification information of a mobile vehicle mounted with advertisement display apparatus (DA1) 210, or identification information of advertisement display apparatus (DA1) 210, (ii) information on a current location of the mobile vehicle, and (iii) information on a moving direction of the mobile vehicle.

In the case that the advertisement update request message is received from advertisement display apparatuses (DA1) 210, advertisement server 230 may select relatively optimal advertisement content to be displayed on advertisement display apparatus 210, based on the received advertisement target information (e.g., information on the advertisement audiences around the current stop). Advertisement server 230 may transmit the selected advertisement content to advertisement display apparatus (DA1) 210. In this case, advertisement server 230 may further transmit display control information associated with the selected advertisement content, to advertisement display apparatus (DA1) 210.

In addition, advertisement server 230 may collect (or receive) at least one of traffic information, weather information, and event information around a station (e.g., a bus stop) from at least one of traffic server 240, weather server 241, and event server 242. In this case, at least one of the traffic information, the weather information, and the event information may be used to select the advertisement content. At least one of traffic server 240, weather server 241, and event server 242 may be selectively included in the advertisement service system in accordance with the present embodiment.

Figure 3:
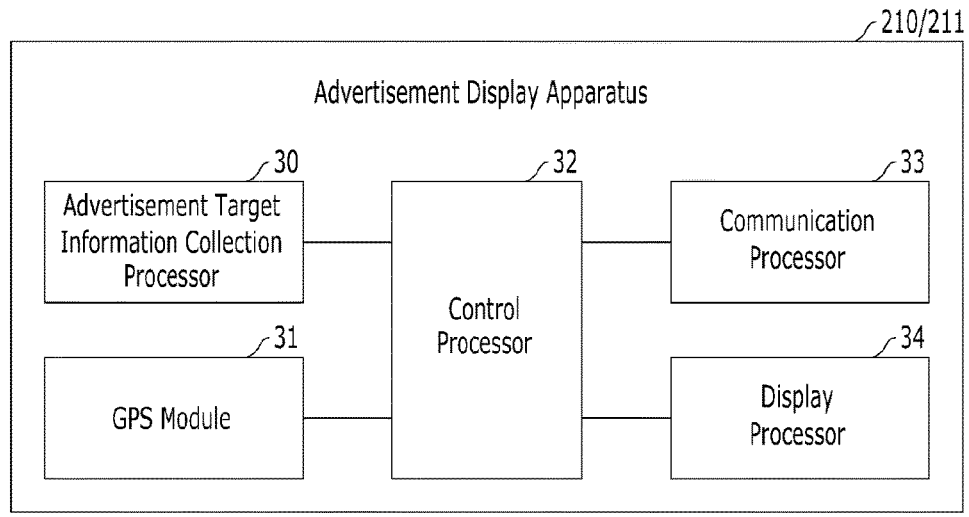
FIG. 3 illustrates a structure of an advertisement display apparatus in accordance with at least one embodiment.

FIG. 3 illustrates a structure of the advertisement display apparatus in accordance with at least one embodiment.

As shown in FIG. 3, advertisement display apparatus 210 or 211 in accordance with at least one embodiment may include advertisement target information collection processor 30, GPS module 31, control processor 32, communication processor 33, and display processor 34. As described above, advertisement display apparatus 210 or 211 may be installed in (or mounted on) a mobile vehicle.

As described in FIG. 2, in case of advertisement display apparatus (DA3) 211, advertisement target information collection processor 30 may collect advertisement target information in various methods. For example, in the case that a mobile vehicle is a bus, advertisement target information collection processor 30 may collect information associated with passengers waiting at a bus stop. The advertisement target information may include information to which personal information of waiting passengers is not reflected. Alternatively, the advertisement target information may include information to which personal information of waiting passengers is reflected. In this case, the advertisement target information may be used to select relatively optimal advertisement content to be displayed on advertisement display apparatus (DA1) 210, regardless of the reflection of the personal information.

More specifically, in the case that personal information of waiting passengers is not reflected to advertisement target information, the advertisement target information may include statistical information on waiting passengers. For example, advertisement target information collection processor 30 may include at least one camera (or at least one infrared camera used at night when lights are dimmed). Before or when a mobile vehicle with advertisement display apparatus (DA3) 211 arrives at a station, advertisement target information collection processor 30 of advertisement display apparatus (DA3) 211 may receive an advertisement target information collection request message (i.e., a broadcast message requesting to collect advertisement target information), from advertisement display apparatus (DA1) 210 of another mobile vehicle having already entered the station (e.g., bus stop) within a predetermined distance from the station. When receiving the broadcast message (i.e., advertisement target information collection request message), advertisement target information collection processor 30 may take a photograph and/or a video of passengers waiting at the station (e.g., bus stop) in real time or periodically. Advertisement target information collection processor 30 may obtain (or extract) advertisement target information by analyzing the taken photograph or video data. The advertisement target information may include statistical information such as (i) the number of passengers waiting at the station, (ii) a gender ratio of the passengers, and (iii) an age ratio of the passengers. In this case, it is obvious that the photograph/video analyzing method may use any analysis scheme well known in the art. In other embodiments, in the case that advertisement display apparatus (DA3) 211 transmits image data (e.g., photograph or video data) to advertisement server 230, the analysis scheme may be performed in advertisement server 230. In another embodiment, advertisement target information collection processor 30 of advertisement display apparatus (DA3) 211 may in real time or periodically obtain advertisement target information regardless of receiving an advertisement target information collection request message.

Meanwhile, in the case that personal information of waiting passengers is reflected to advertisement target information, the advertisement target information may include information on a mobile terminal held by each passenger. More specifically, mobile terminals, to which NFC, Bluetooth, Zigbee technologies are applied, have recently been launched. In the case that waiting passengers hold such mobile terminals, information on advertisement audiences (e.g., waiting passengers) around a station (e.g., a bus stop) may be collected through near-field communication with the mobile terminals. The information on the mobile terminals may include information on (i) a terminal type (e.g., a smart phone, a smart pad, a notebook, etc.), (ii) a manufacturer, (iii) a content of a social message the advertisement audience currently transmits and receives through the mobile terminal, and/or (iv) music/video/advertisement the advertisement audience currently listens to. However, in this example, even if information to which personal information of waiting passengers is reflected is collected as advertisement target information, identification information of each passenger (or mobile terminal) may not be collected.

Meanwhile, GPS module 31 may obtain location information of a corresponding mobile vehicle.

Control processor 32 may control operations of each element of advertisement display apparatus 210 or 211. Control processor 32 may use the location information of the mobile vehicle to determine whether advertisement display apparatus (DA1) 210 has entered within a predetermined distance from a station (e.g., a bus stop). In addition, when it is determined that the mobile vehicle has entered within the predetermined distance from the station, control processor 32 of advertisement display apparatus (DA1) 210 may create an advertisement target information collection request message to be transmitted to peripheral devices (e.g., 220, 211) around the station. The peripheral devices around the station may include (i) advertisement display apparatus (DA3) 211 of the mobile vehicle having arrived at the station (e.g., bus stop), and/or (ii) advertisement target information collection apparatus 220 installed at an appropriate location of the station (e.g., bus stop). The advertisement target information collection request message may correspond to a message which requests to collect advertisement target information on the surrounding of the station (e.g., bus stop) and/or to transmit the collected advertisement target information to advertisement server 230. Furthermore, the advertisement target information collection request message may further include at least one of (i) identification information (ID) of a mobile vehicle (e.g., a bus), or identification information (ID) of advertisement display apparatus (DA1) 210, (ii) information on the current location of the mobile vehicle, and (iii) a traveling direction of the mobile vehicle.

Communication processor 33 may transmit and receive messages. More specifically, communication processor 33 (e.g., communication processor 33 of advertisement display apparatus (DA1) 210) may transmit a message (e.g., an advertisement target information collection request message) under the control of control processor 32. Furthermore, communication processor 33 (e.g., communication processor 33 of advertisement display apparatus (DA1) 210) may transmit advertisement display result information to advertisement server 230. Alternatively, communication processor 33 (e.g., communication processor 33 of advertisement display apparatus (DA3) 211) may receive a message (e.g., an advertisement target information collection request message) from another mobile vehicle (more specifically, advertisement display apparatus (DA1) 210). Communication processor 33 (e.g., communication processor 33 of advertisement display apparatus (DA3) 211) may transmit the obtained advertisement target information and/or image data (e.g., photograph and/or video data) of an advertisement target (e.g., an advertisement audience). In this case, at least one of (i) identification information (ID) of advertisement display apparatus (DA3) 211, or identification information (ID) of a corresponding mobile vehicle, (ii) location information of advertisement display apparatus (DA3) 211, (iii) traveling direction information of advertisement display apparatus (DA3) 211, and (iv) time information associated with obtaining the advertisement target information may be further transmitted to advertisement server 230. In addition, communication processor 33 (e.g., communication processor 33 of advertisement display apparatus (DA3) 211) may further transmit information on a current advertisement content being displayed, to advertisement server 230. Herein, the current advertisement content may represent advertisement content being currently displayed on display processor 34 while the corresponding bus (i.e., the bus where advertisement display apparatus (DA3) 211 is installed) is arriving (i.e., stops) at the bus stop.

Communication processor 33 (e.g., communication processor 33 of advertisement display apparatus (DA1) 210) may receive selected advertisement content and/or display control information associated with the selected advertisement content, from advertisement server 230.

Display processor 34 may display advertisement content received from advertisement server 230 to the outside of the mobile vehicle at an appropriate location on a screen. In this case, display processor 34 may display the advertisement content according to the received display control information.

Figure 4:
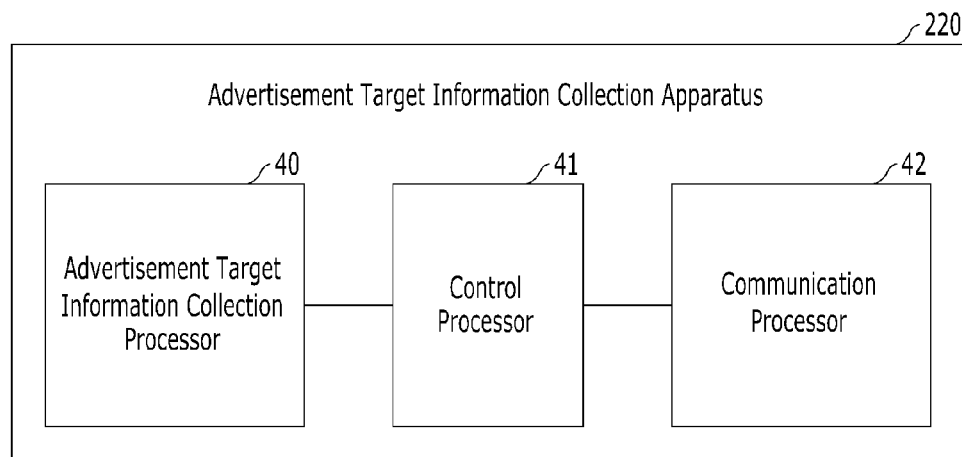
FIG. 4 illustrates a structure of an advertisement target information collection apparatus in accordance with at least one embodiment.

FIG. 4 illustrates a structure of an advertisement target information collection apparatus in accordance with at least one embodiment.

As shown in FIG. 4, advertisement target information collection apparatus (DA2) 220 may include advertisement target information collection processor 40, control processor 41, and communication processor 42. Herein, advertisement target information collection apparatus 220 may be installed at a station (e.g., a bus stop) and/or at an arbitrary location around the station.

Since advertisement target information collection processor 40 is the same as or similar to advertisement target information collection processor 30 of advertisement display apparatus 210 or 211, a detailed description thereof will be omitted hereinafter. In other embodiments, advertisement target information collection processor 40 may in real time or periodically obtain advertisement target information regardless of receiving an advertisement target information collection request message.

Control processor 41 may control operations of each element of advertisement target information collection apparatus 220.

Communication processor 42 may receive messages (e.g., an advertisement target information collection request message) from advertisement display apparatus (DA1) 210 under the control of control processor 41. In order to update advertisement content to be displayed at the station (e.g., bus stop) by advertisement display apparatus 210, communication processor 42 may transmit advertisement target information on surrounding of the station (e.g., bus stop), to advertisement server 230. In this case, at least one of (i) identification information (ID) of advertisement target information collection apparatus (DA2) 220, or identification information (ID) of corresponding station, (ii) location information of advertisement target information collection apparatus (DA2) 220, (iii) direction information of a corresponding bus stop in the case that the corresponding station (e.g., bus stop) is at the center of two-way road, and (iv) time information associated with obtaining the advertisement target information may be further transmitted to advertisement server 230. Herein, the advertisement target information may be obtained by advertisement target information collection processor 40.

In other embodiments, in the case that advertisement target information collection apparatus (DA2) 220 transmits image data (e.g., photograph or video data) to advertisement server 230, the analysis scheme may be performed in advertisement server 230.

Figure 5:
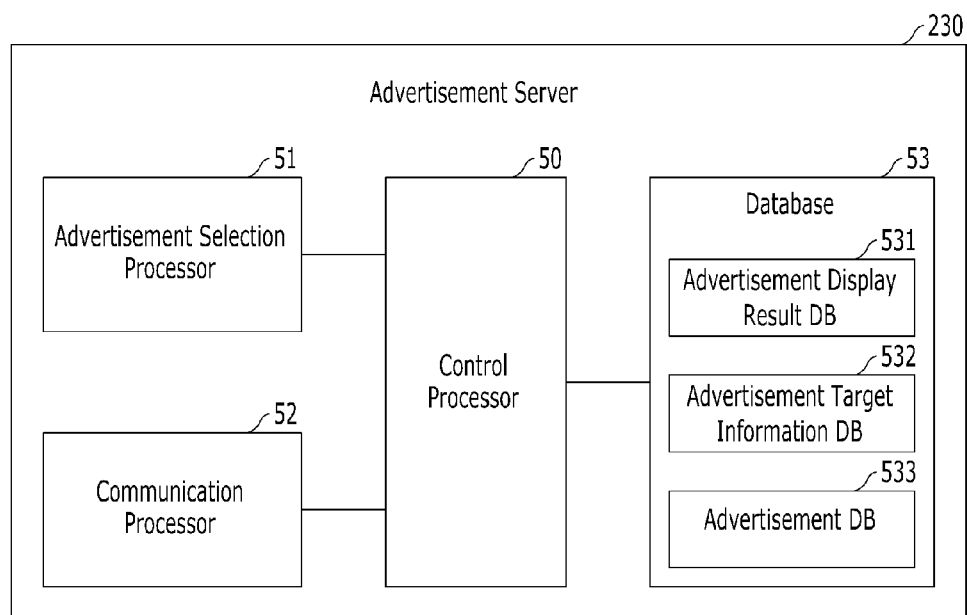
FIG. 5 illustrates a structure of an advertisement server in accordance with at least one embodiment.

FIG. 5 illustrates a structure of an advertisement server in accordance with at least one embodiment.

As shown in FIG. 5, advertisement server 230 in accordance with at least one embodiment may include control processor 50, advertisement selection processor 51, communication processor 52, and database (DB) 53.

Control processor 50 may control operations of each element of advertisement server 230. More specifically, control processor 50 may perform control operations, in order to select advertisement content to be displayed on advertisement display apparatus 210 of a mobile vehicle and transmit the relevant information to the mobile vehicle as described below.

Advertisement selection processor 51 may select relatively optimal advertisement content to be displayed on advertisement display apparatus (DA1) 210 of a mobile vehicle, based on advertisement target information. Herein, the advertisement target information may be received from at least one of (i) advertisement target information collection apparatus (DA2) 220 installed at a station (e.g., bus stop) and (ii) advertisement display apparatus (DA3) 211 of the mobile vehicle stopping to take or leave passengers in the vicinity of the station. Furthermore, advertisement selection processor 51 may create display control information associated with selected advertisement content.

In other embodiments, in the case that image data (e.g., photograph or video data) is received from at least one of advertisement target information collection apparatus (DA2) 220 and advertisement display apparatus (DA3) 211, advertisement selection processor 51 may obtain advertisement target information by analyzing the image data.

Communication processor 52 may transmit and receive messages. More specifically, communication processor 52 may receive the advertisement target information from advertisement target information collection apparatus (DA2) 220 and/or advertisement display apparatus (DA3) 211. Furthermore, communication processor 52 may receive an advertisement update request message from advertisement display apparatus (DA1) 210. Communication processor 52 may receive advertisement display result information from advertisement display apparatus (DA1) 210. Meanwhile, communication processor 52 may transmit selected advertisement content for display on advertisement display apparatus (DA1) 210, to advertisement display apparatus (DA1) 210. Furthermore, communication processor 52 may transmit display control information associated with the selected advertisement content, to advertisement display apparatus (DA1) 210.

Database (DB) 53 may include advertisement display result DB 531, advertisement target information DB 532, and advertisement DB 533. Advertisement display result DB 531 may store an advertisement display result about advertisement content displayed on advertisement display apparatus 210 or 211 of each mobile vehicle. Advertisement target information DB 532 may store (i) advertisement target information received from at least one of advertisement display apparatus 211 and advertisement target information collection apparatus 220, and/or (ii) advertisement target information obtained through an image analysis of advertisement selection processor 51.

Advertisement DB 533 may store various advertisement contents for display on a mobile vehicle. Selection conditions (e.g., age condition, gender condition, etc.) for each advertisement content, and/or the created display control information may be additionally stored in advertisement DB 533.

Figure 6:
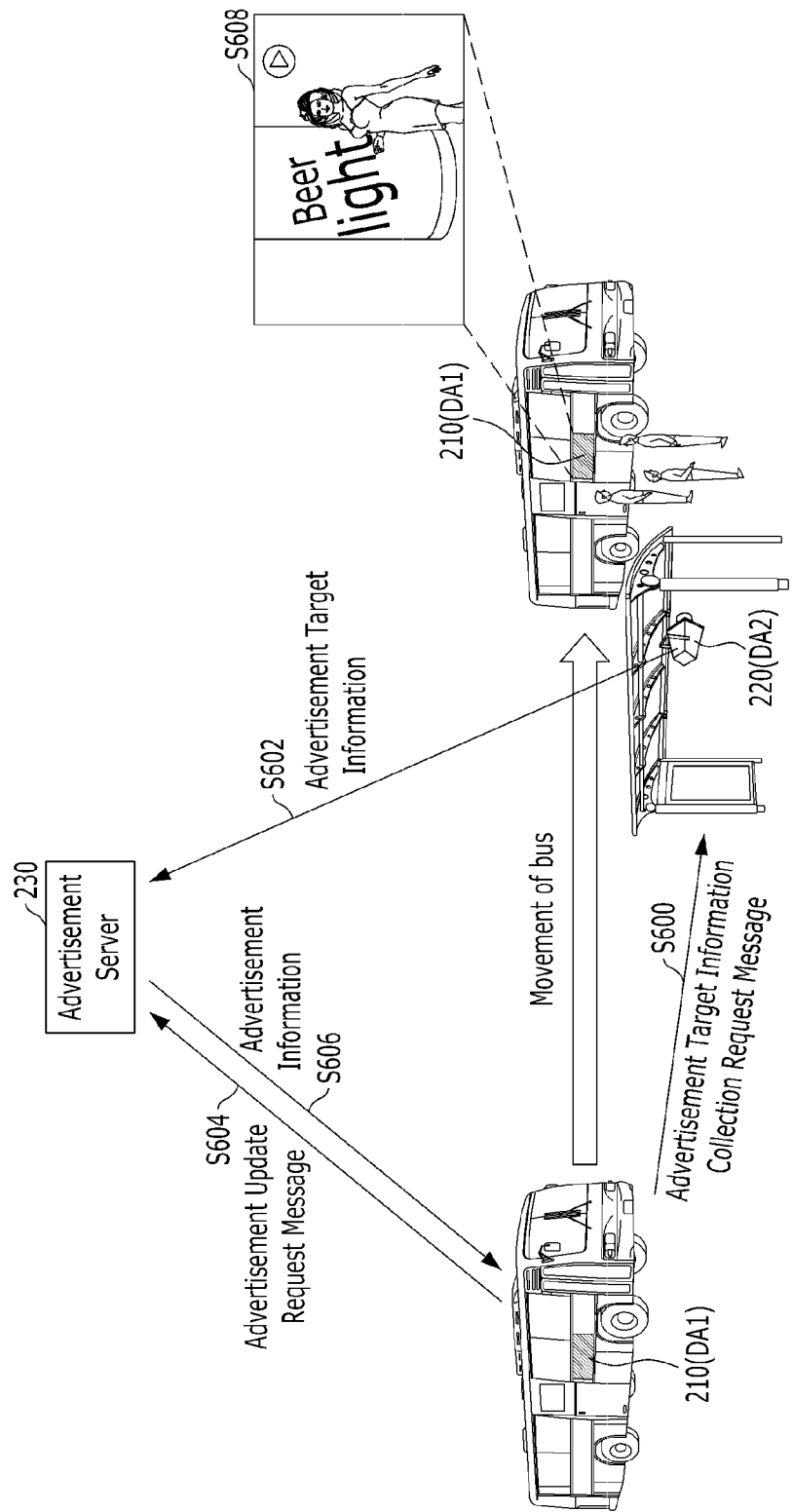
FIG. 6 illustrates providing an advertisement service using a mobile vehicle in the case that other mobile vehicles are not located at a specific advertisement display location, in accordance with at least one embodiment.

FIG. 6 illustrates providing an advertisement service using a mobile vehicle in the case that other mobile vehicles are not located at a specific advertisement display location, in accordance with at least one embodiment.

Hereinafter, an embodiment in which an advertisement is displayed on a bus will be described, but the same techniques may be applied to other mobile vehicles (e.g., a taxi, a truck, a train, a subway, and so forth).

For example, a time interval (which may be referred to as an allocation interval of mobile vehicles) when buses pass through a bus stop may be a long period of time. In this case, when a specific bus enters within a predetermined distance from the bus stop, there may be no other buses stopping at the bus stop (i.e., other buses stopping to take or leave passengers). Herein, the bus stop may represent a location at which an advertisement target (e.g., advertisement audiences) is. Accordingly, a specific place (e.g., a bus stop) where an advertisement target (i.e., an advertisement audience) is may be referred to as "an advertisement display location." The present embodiment shown in FIG. 6 relates to a method of selecting and displaying an advertisement when the allocation interval (i.e., a time interval between buses) is a long period of time.

At step S600, when a bus mounted with advertisement display apparatus (DA1) 210 enters within a predetermined distance from a bus stop, advertisement display apparatus (DA1) 210 may broadcast an advertisement target information collection request message. Herein, the advertisement target information collection request message may represent a request message instructing neighboring devices (i.e., devices around the bus stop, for example, advertisement target information collection apparatus (DA2) 220) to, in real time or periodically, obtain advertisement target information. Furthermore, the advertisement target information collection request message may further include at least one of (i) identification information (ID) of the bus, or identification information (ID) of advertisement display apparatus (DA1) 210, (ii) information on the current location of the bus, and (iii) a traveling direction of the bus.

In the case that the time interval of buses entering the bus stop is a long period of time, no other buses may have arrived at the bus stop when advertisement display apparatus (DA1) 210 broadcasts an advertisement target information collection request message. In this case, the advertisement target information collection request message may be received by only advertisement target information collection apparatus (DA2) 220 installed in the bus stop. At step S602, when receiving the advertisement target information collection request message, advertisement target information collection apparatus (DA2) 220 may obtain information on passengers (i.e., advertisement targets) waiting at the bus stop, and transmit the information (i.e., advertisement target information) to advertisement server 230. More specifically, advertisement target information collection apparatus (DA2) 220 may obtain image data (e.g., a photograph and/or a video) on the waiting passengers (i.e., advertisement targets) using at least one camera device, and extract information (e.g., statistical information) associated with the advertisement target from the image data, by analyzing the image data. Herein, the statistical information associated with the advertisement target may include at least one of the number of advertisement audiences, a gender ratio of the advertisement audiences, and an age ratio of the advertisement audiences. Advertisement target information collection apparatus (DA2) 220 may transmit the extracted advertisement target information to advertisement server 230. In this case, at least one of (i) the identification information (ID) of advertisement target information collection apparatus (DA2) 220, or identification information (ID) of corresponding station, (ii) location information of advertisement target information collection apparatus (DA2) 220, (iii) direction information of a corresponding bus stop in the case that the corresponding bus stop is at the center of two-way road, and (iv) time information associated with obtaining the advertisement target information may be further transmitted to advertisement server 230.

In other embodiments, advertisement target information collection apparatus (DA2) 220 may obtain image data (e.g., photograph or video data) of an advertisement target (i.e., an advertisement audience, for example passengers waiting for a bus at a bus stop), and transmit the image data to advertisement server 230, without performing image analysis. In this case, advertisement server 230 may obtain (or extract) advertisement target information by analyzing the image data.

Meanwhile, when receiving the advertisement target information form advertisement target information collection apparatus (DA2) 220, advertisement server 230 may store the received advertisement target information.

Thereafter, at step S604, advertisement display apparatus (DA1) 210 may transmit an advertisement update request message to advertisement server 230 in order to receive information on advertisement content to be displayed when arriving at the bus stop (i.e., a predetermined advertisement display location). Herein, the advertisement update request message may include at least one of (i) identification information of advertisement display apparatus (DA1) 210, or identification information (ID) of a corresponding bus (i.e., identification information (ID) of the bus mounted with advertisement display apparatus (DA1) 210), (ii) information on the current location of the corresponding bus (or advertisement display apparatus (DA1) 210), and (iii) traveling direction information of the corresponding bus (or advertisement display apparatus (DA1) 210). The advertisement update request message may be simply referred to as "advertisement request message."

When receiving the advertisement update request message from advertisement display apparatus (DA1) 210, advertisement server 230 may select relatively optimal advertisement content among a variety of advertisement contents stored in advertisement DB 533, based on (i) the information included in the advertisement update request message received at step S604 and (ii) the advertisement target information received at step S602. In other embodiments, in the case that image data (e.g., photograph or video data) is received from at least one of advertisement target information collection apparatus (DA2) 220 and advertisement display apparatus (DA3) 211, advertisement server 230 may obtain (or extract) advertisement target information by analyzing the image data. At step S606, advertisement server 230 may transmit the selected advertisement content to advertisement display apparatus (DA1) 210. In this case, advertisement server 230 may transmit display control information associated with the selected advertisement content, to advertisement display apparatus (DA1) 210. In other embodiments, advertisement server 230 may select and transmit a relatively optimal advertisement content, based on location information of mobile vehicles, regardless of receiving an advertisement update request message.

At step S608, when receiving the information on the selected advertisement content from advertisement server 230, advertisement display apparatus (DA1) 210 of the corresponding bus may display the received advertisement content, from an advertisement display start position.

Figure 7:
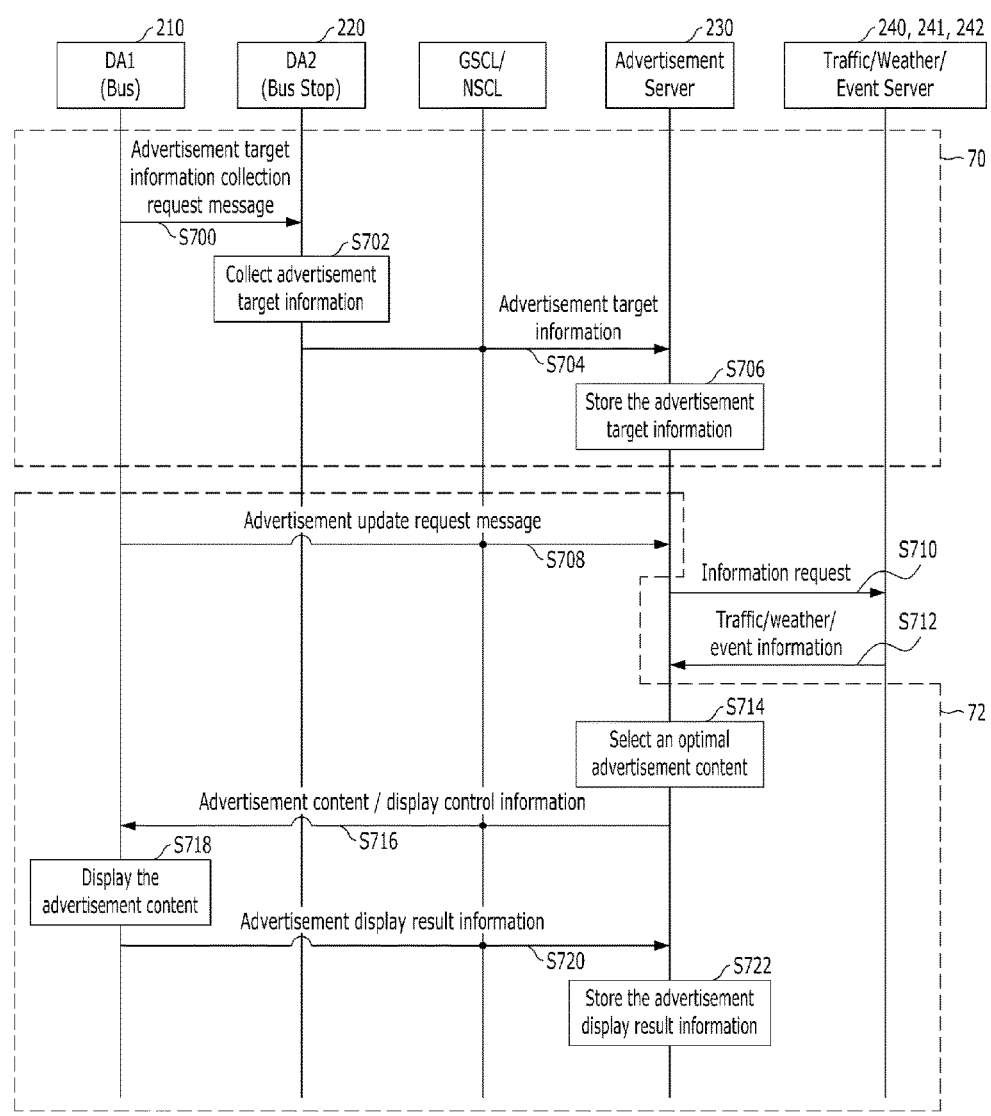
FIG. 7 is a flowchart illustrating a method of providing an advertisement service using mobile vehicles, relevant to the embodiment of FIG. 6, in accordance with at least one embodiment.

FIG. 7 is a flowchart illustrating a method of providing an advertisement service using mobile vehicles, relevant to the embodiment of FIG. 6, in accordance with at least one embodiment.

In FIG. 7, "70" represents a procedure of collecting advertisement target information, and "72" represents a procedure of requesting and displaying an advertisement content.

Advertisement display apparatus (DA1) 210 may obtain location information of the bus, using through GPS module 31. Herein, the location information of the bus may be referred to as "location information of advertisement display apparatus (DA1) 210 since advertisement display apparatus (DA1) 210 is installed in the bus. By using the location information of the bus (or location information of advertisement display apparatus (DA1) 210), advertisement display apparatus (DA1) 210 installed in the bus being driven may determine whether advertisement display apparatus (DA1) 210 has entered within a predetermined distance from the bus stop (e.g., the bus stop where DA2 is mounted). In this case, advertisement display apparatus (DA1) 210 may previously store location information of the bus stop in a storage unit (not shown).

At step S700, in order to collect advertisement target information (e.g., information on passengers waiting at the bus stop) before receiving advertisement update information (e.g., before updating advertisement content to be displayed on advertisement display apparatus (DA1) 210 when the bus arrives at the bus stop), advertisement display apparatus (DA1) 210 may transmit (e.g., broadcast) an advertisement target information collection request message to the surrounding of the bus stop. Herein, the advertisement target information collection request message may be a message requesting to in real time or periodically collect advertisement target information and transmit the collected information to advertisement server 230. Furthermore, the advertisement target information collection request message may further include at least one of (i) identification information (ID) of the bus, or identification information (ID) of advertisement display apparatus (DA1) 210, (ii) information on the current location of the bus, and (iii) a traveling direction of the bus.

The present embodiment relates to the case where there are no other buses having arrived at the bus stop, when the bus including advertisement display apparatus (DA1) 210 enters within a predetermined distance from the bus stop. In this case, as shown in FIG. 6, only advertisement target information collection apparatus (DA2) 220 installed at a predetermined position of the bus stop may receive the advertisement target information collection request message. Therefore, at step S702, when receiving the advertisement target information collection request message, advertisement target information collection apparatus (DA2) 220 may execute an internal process of collecting advertisement target information (e.g., information on passengers waiting at the current stop). For example, in the case that advertisement target information collection apparatus (DA2) 220 includes at least one camera (or an infrared camera), advertisement target information collection apparatus (DA2) 220 may in real time or periodically obtain image data (e.g., a photograph and/or a video) of the waiting passengers (i.e., current passengers waiting at the bus stop) using at least one camera device, and obtain advertisement target information by analyzing the image data using a variety of typical image processing techniques. Herein, the advertisement target information may correspond to information (e.g., statistical information) associated with the current passengers waiting at the bus stop. The statistical information associated with the current passengers (i.e., advertisement audiences) may include at least one of the number of advertisement audiences (e.g., the number of waiting passengers), a gender ratio of the advertisement audiences (e.g., a gender ratio of waiting passengers), and an age ratio of the advertisement audiences (e.g., an age ratio of waiting passengers).

At step S704, advertisement target information collection apparatus (DA2) 220 may transmit the obtained advertisement target information (e.g., real-time advertisement target information) to advertisement server 230 via GSCL/NSCL. In this case, at least one of (i) identification information (ID) of advertisement target information collection apparatus (DA2) 220, or identification information (ID) of corresponding station, (ii) location information of advertisement target information collection apparatus (DA2) 220, (iii) direction information of a corresponding bus stop in the case that the corresponding bus stop is at the center of two-way road, and (iv) time information associated with obtaining the advertisement target information may be further transmitted to advertisement server 230.

At step S706, when receiving the advertisement target information from advertisement target information collection apparatus (DA2) 220, advertisement server 230 may store the received advertisement target information in advertisement target information DB 532.

As described above, steps S700 to S706 ("70") form the procedure of collecting advertisement target information, and the subsequent steps ("72") form the procedure of requesting and displaying advertisement content.

At step S708, advertisement display apparatus (DA1) 210 may transmit an advertisement update request message (may be simply referred to as "advertisement request message") to advertisement server 230 in order to receive advertisement content. Herein, the advertisement update request message may include at least one of (i) identification information of advertisement display apparatus (DA1) 210 (or identification information of a corresponding bus), (ii) information on the current location of the corresponding bus (or advertisement display apparatus (DA1) 210), and (iii) traveling direction information of the corresponding bus (or advertisement display apparatus (DA1) 210). The current location information and the traveling direction information may be obtained by GPS module 31.

At steps S710 and S712, prior to the advertisement selection process (S714), advertisement server 230 may communicate with at least one of traffic server 240, weather server 241 and event server 242 in order to select a more optimal advertisement by way of more accurately determining environmental situations around the bus stop. That is, prior to the advertisement selection process, advertisement server 230 may acquire at least one of traffic information, weather information, and event information around the bus stop, from at least one of traffic server 240, weather server 241, and event server 242. The procedure of interworking advertisement server 230 with at least one of traffic server 240, weather server 241, and event server 242 may be omitted or be optionally performed.

At step S714, when receiving the advertisement update request message from advertisement display apparatus (DA1) 210, advertisement server 230 may select relatively optimal advertisement content to be displayed on advertisement display apparatus (DA1) 210, based on the information stored in DB 53. More specifically, advertisement server 230 may select relatively optimal advertisement contents to be displayed on advertisement display apparatus (DA1) 210 among one or more advertisement contents stored in advertisement DB 533, based on at least one of (i) information included in the advertisement update request message (e.g., information on advertisement display apparatus (DA1) 210), (ii) advertisement target information which is received from advertisement target information collection apparatus (DA2) 220 of the bus stop and stored in advertisement target information DB 532, and (iii) traffic information, weather information, and/or event information around the bus stop. In other embodiments, advertisement server 230 may select and transmit relatively optimal advertisement content, based on location information of mobile vehicles, regardless of receiving an advertisement update request message.

Particularly, the selected optimal advertisement content may be advertisement content associated with the advertisement target information. For example, in the case that (i) it is a hot summer, (ii) a ratio of male is high among passengers currently waiting at a station (e.g., a bus stop), (iii) a ratio of age group is high in 20s and 30s, advertisement server 230 may determine, and (iv) a current time is evening time, advertisement server 230 (more specifically, advertisement selection processor 51) may select a 'beer' advertisement in order to enhance an advertisement effect. As another example, when it is determined that (i) it is a cold winter, (ii) a ratio of female is high among passengers currently waiting at a bus stop, and (iii) a ratio of age group is high in 40s and 50s, advertisement server 230 (more specifically, advertisement selection processor 51) may select advertisement content associated with 'winter clothing' in order to enhance an advertisement effect. In addition, in the case that the collected advertisement target information is information on mobile terminals of the currently waiting passengers, advertisement server 230 (more specifically, advertisement selection processor 51) may obtain information on at least one of (i) types of the mobile terminals, (ii) manufacturers of the mobile terminals, (iii) contents of social messages currently transmitted and received through the mobile terminals by the advertisement audiences, and (iv) a music content, a video content, and/or an advertisement which the advertisement audiences currently listen and watch through the mobile terminals. In this case, advertisement server 230 (more specifically, advertisement selection processor 51) may select advertisement content associated with the currently waiting passengers and/or interesting fields of the passengers, based on the obtained information.

At step S716, advertisement server 230 may transmit advertisement information including the selected advertisement content, to advertisement display apparatus (DA1) 210 having transmitted the advertisement update request message (S708). In other embodiments, advertisement server 230 may transmit display control information together with the selected advertisement content. The advertisement content and the display control information may be collectively referred to as "advertisement information." The display control information may include at least one of (i) advertisement display start location information (i.e., information on how close to the bus stop the advertisement content display is started, for example, latitude/longitude), (ii) a maximum number of display repetitions, and (iii) advertisement display start time information (i.e., information on a time when advertisement content is displayed). For example, the advertisement content may be displayed at least one of (i) when arriving at the bus stop, (ii) approximately at the same time as the broadcasting (S700) of the advertisement target information collection request message to devices (e.g., DA2) around the bus stop, and (iii) within a predetermined time after performing the broadcasting procedure (S700).

At step S718, when receiving the advertisement information (e.g., the selected advertisement content and/or the display control information), advertisement display apparatus (DA1) 210 may display the received advertisement content on display processor 34, according to the received display control information. For example, advertisement display apparatus (DA1) 210 may display the received advertisement content when arriving at the advertisement display start location (e.g., a bus stop).

At step S720, when the display of the received advertisement content is complete, advertisement display apparatus (DA1) 210 may transmit information on an advertisement display result to advertisement server 230. More specifically, in any one of (i) a case where advertisement display apparatus (DA1) 210 displays all advertisement contents received from advertisement server 230, (ii) a case where advertisement display apparatus (DA1) 210 displays advertisement content as many as the maximum number of display repetitions received from advertisement server 230, and (iii) a case where the bus takes passengers waiting at a bus stop and leaves the bus stop, advertisement display apparatus (DA1) 210 may transmit 'advertisement display result information' to advertisement server 230 before displaying another advertisement. The advertisement display result information may include identification information of advertisement display apparatus (DA1) 210 (or identification information of a bus mounted with advertisement display apparatus (DA1) 210), identification information of a displayed advertisement content, the number of repetitions of display, and a display time.

At step S722, when receiving the advertisement display result information from the advertisement display apparatus (DA1) 210, advertisement server 230 may store the received advertisement display result information in advertisement display result DB 531. The advertisement display result information may be used as information for calculating an advertisement fee of an advertiser.

Figure 8:
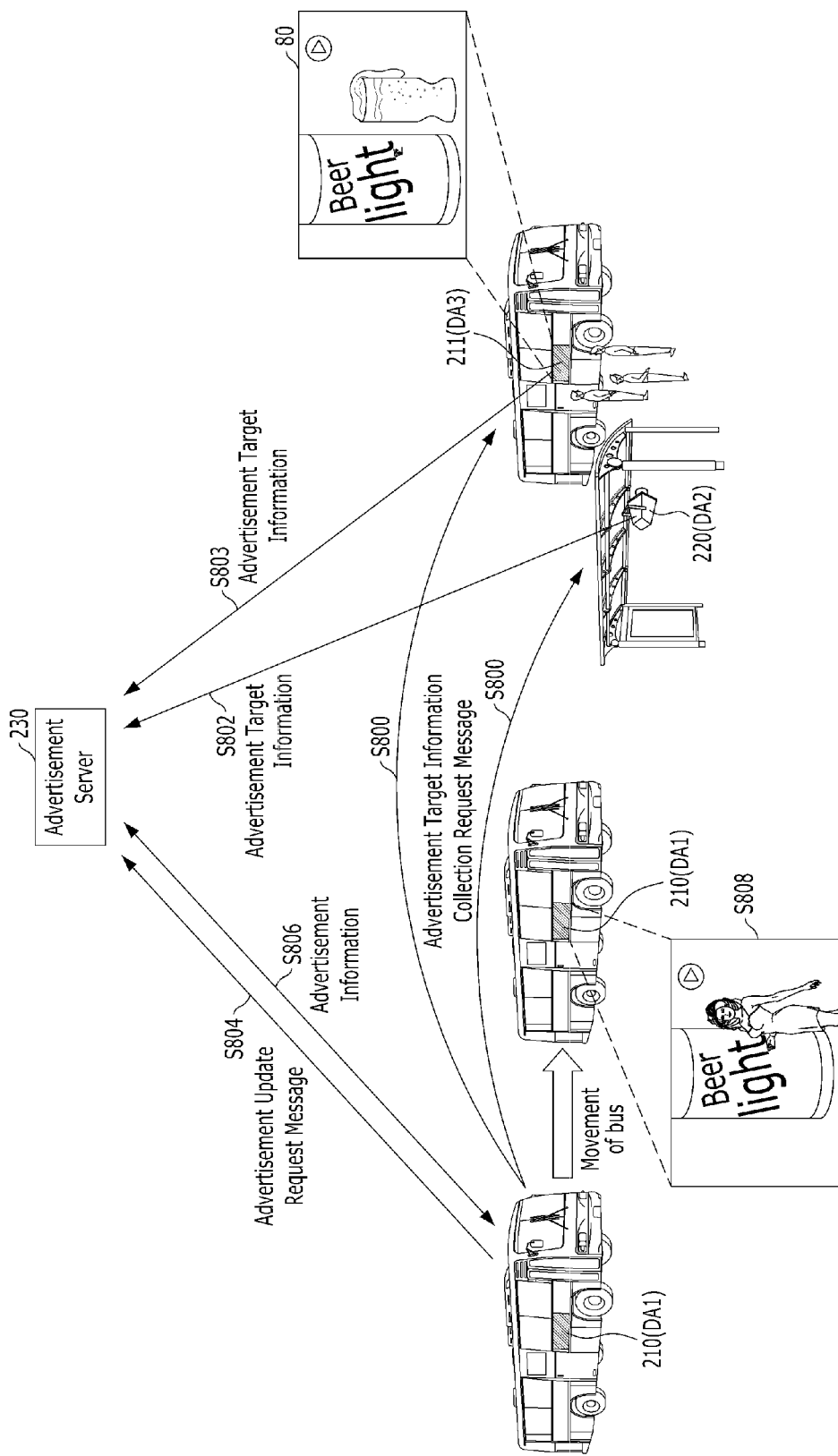
FIG. 8 illustrates providing an advertisement service using a mobile vehicle in the case that another mobile vehicle is located at a specific advertisement display location, in accordance with another embodiment.

FIG. 8 illustrates providing an advertisement service using a mobile vehicle in the case that another mobile vehicle is located at a specific advertisement display location, in accordance with another embodiment.

Unlike the embodiment described with reference to FIGS. 6 and 7, the embodiment illustrated in FIG. 8 may be applied to the case that time interval of buses entering a bus stop are "short." In the case, there may be another bus (i.e., another bus where advertisement display apparatus (DA3) 211 is installed) at the bus stop when advertisement display apparatus (DA1) 210 broadcasts the advertisement target information collection message.

Since the procedures of the present embodiment are substantially similar to those of the embodiment described with reference to FIG. 6, the following description will focus on differences therebetween for convenience.

At step S800, advertisement target information collection apparatus (DA2) 220 installed at the bus stop and advertisement display apparatus (DA3) 211 of another bus having arrived at the bus stop may receive an advertisement target information collection request message broadcasted from advertisement display apparatus (DA1) 210.

The procedures of the present embodiment are identical or similar to those of the embodiment described with reference to FIG. 6. That is, the operations of steps S800, S802, S804, S806, and S808 are substantially identical to those of steps S600, S602, S604, S606, and S608 of FIG. 6. The following description will focus on differences between FIG. 6 and FIG. 8 for convenience.

When receiving the advertisement target information collection message, each of advertisement target information collection apparatus (DA2) 220 and advertisement display apparatus (DA3) 211 may obtain (or collect) information (i.e., advertisement target information) on passengers waiting at the bus stop, and transmit the obtained advertisement target information to advertisement server 230. More specifically, at step S802, advertisement target information collection apparatus (DA2) 220 may obtain information (i.e., advertisement target information) on passengers waiting at the bus stop, and transmit the obtained advertisement target information to advertisement server 230.

Meanwhile, at step S803, in order to increase the accuracy of advertisement target information, advertisement display apparatus (DA3) 211 installed in another bus having arrived at the bus stop may also obtain (or collect) information (i.e., advertisement target information) on passengers waiting at the bus stop, and transmit the obtained advertisement target information to advertisement server 230. At step S803, in particular, after all passengers get into or out of the corresponding bus, advertisement display apparatus (DA3) 211 may obtain (or collect) advertisement target information (i.e., information on passengers left at the bus stop). More specifically, advertisement display apparatus (DA3) 211 may obtain image data (e.g., a photograph and/or a video) of the waiting passengers (i.e., advertisement targets) using at least one camera device, and extract information (e.g., statistical information) associated with the advertisement target from the image data, by analyzing the image data. Herein, the statistical information associated with the advertisement target may include at least one of the number of advertisement audiences, a gender ratio of the advertisement audiences, and an age ratio of the advertisement audiences. Advertisement display apparatus (DA3) 211 may transmit the extracted advertisement target information to advertisement server 230. In this case, at least one of (i) identification information (ID) of advertisement display apparatus (DA3) 211, or identification information (ID) of a corresponding mobile vehicle, (ii) location information of advertisement display apparatus (DA3) 211, (iii) traveling direction information of advertisement display apparatus (DA3) 211, and (iv) time information associated with obtaining the advertisement target information may be further transmitted to advertisement server 230.

In addition, the advertisement target information transmitted to advertisement server 230 by advertisement display apparatus (DA3) 211 may further include information on a current advertisement content ("80") being displayed on display processor 34 while the corresponding bus (i.e., the bus where advertisement display apparatus (DA3) 211 is installed) stops at the bus stop.

In other embodiments, advertisement target information collection apparatus (DA2) 220 may obtain image data (e.g., photograph or video data) of an advertisement target (i.e., an advertisement audience, for example passengers waiting for a bus at a bus stop), and transmit the image data to advertisement server 230, without performing image analysis. In this case, advertisement server 230 may obtain (or extract) advertisement target information by analyzing the image data.

Figure 9:
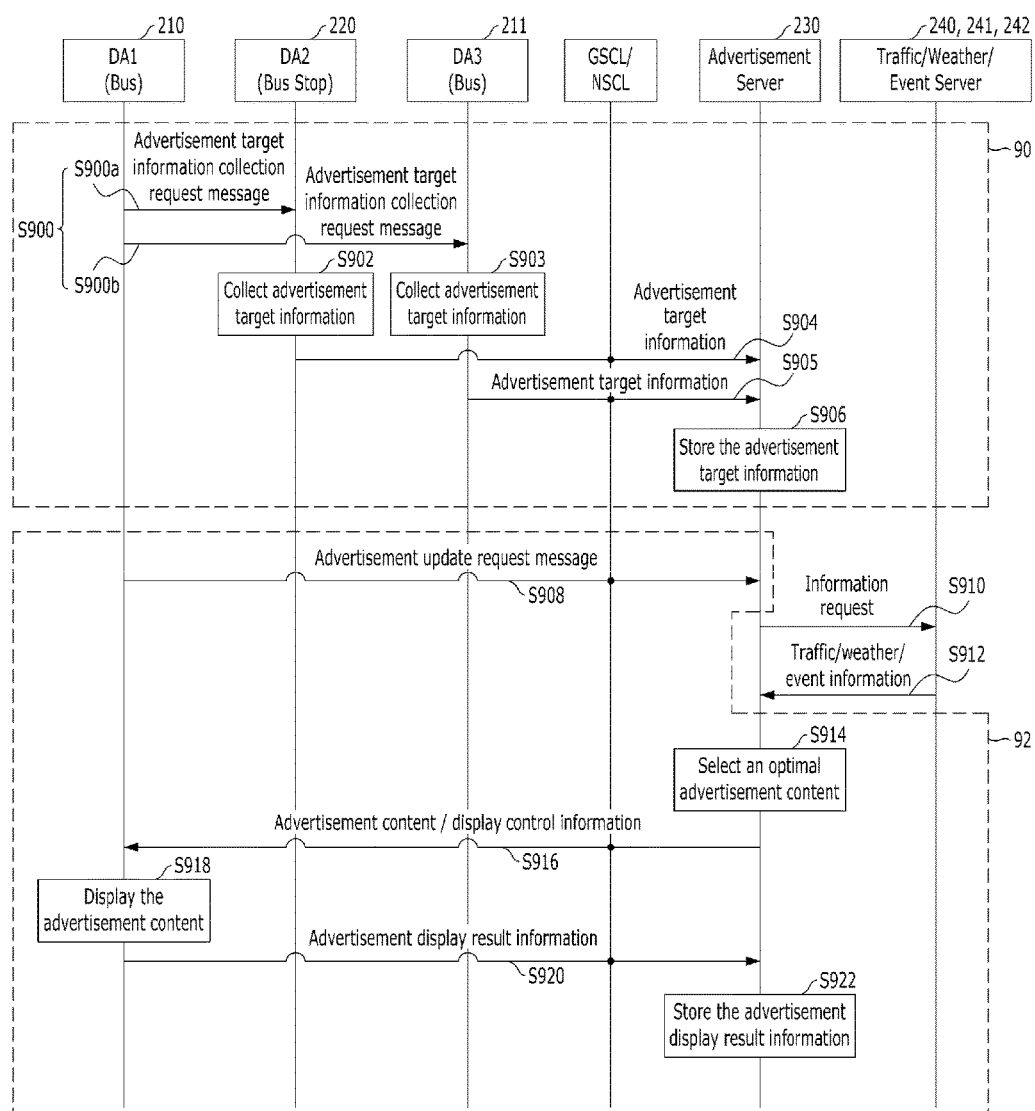
FIG. 9 is a flowchart illustrating a method of providing an advertisement service using mobile vehicles, relevant to the embodiment of FIG. 8, in accordance with at least one embodiment.

FIG. 9 is a flowchart illustrating a method of providing an advertisement service using mobile vehicles, relevant to the embodiment of FIG. 8, in accordance with at least one embodiment. In FIG. 9, "90" represents a procedure of collecting advertisement target information, and "92" represents a procedure of requesting and displaying an advertisement content.

Since the procedures of the present embodiment are substantially similar to those of the embodiment described with reference to FIG. 7, the following description will focus on differences therebetween for convenience. That is, the operations of steps S900a, S902, S904, S906, S908, S910, S912, S916, S918, S920, and S922 are substantially identical or similar to those of steps S700, S702, S704, S706, S708, S710, S712, S716, S718, S720, and S722 of FIG. 7. The following description will focus on differences between FIG. 7 and FIG. 9 for convenience.

At step S900, advertisement display apparatus (DA1) 210 installed in (or mounted on) the corresponding bus may broadcast an advertisement target information collection request message to devices (e.g., DA2, DA3) around the bus stop. In this case, at steps S900a and S900b, (i) advertisement target information collection apparatus (DA2) 220 installed at the bus stop and (ii) advertisement display apparatus (DA3) 211 of another bus having arrived at the bus stop may receive the advertisement target information collection request message. Herein, the advertisement target information collection request message may be a message requesting to in real time or periodically collect advertisement target information and transmit the collected information to advertisement server 230. Furthermore, the advertisement target information collection request message may further include identification information (ID) of the bus (or identification information (ID) of advertisement display apparatus (DA1) 210), information on the current location of the bus, a traveling direction of the bus, and so forth.

At steps S902 and S903, when receiving the advertisement target information collection request message (S900a, S900b), advertisement target information collection apparatus (DA2) 220 and advertisement display apparatus (DA3) 211 may collect (or obtain) advertisement target information. In particular, at step S903, when receiving the advertisement target information collection request message transmitted from advertisement display apparatus (DA1) 210, advertisement display apparatus (DA3) 211 may also collect information on passengers waiting at the current bus stop (i.e., advertisement target information).

At step S905, advertisement display apparatus (DA3) 211 may transmit the collected advertisement target information to advertisement server 230 via GSCL/NSCL. In this case, at least one of (i) identification information (ID) of advertisement display apparatus (DA3) 211, or identification information (ID) of a corresponding mobile vehicle, (ii) location information of advertisement display apparatus (DA3) 211, (iii) traveling direction information of advertisement display apparatus (DA3) 211, and (iv) time information associated with obtaining the advertisement target information may be further transmitted to advertisement server 230. The transmitted advertisement target information may also include information on a current advertisement content being displayed at the current bus stop. More specifically, advertisement display apparatus (DA3) 211 may further transmit information on a current advertisement content being displayed while the corresponding bus (i.e., the bus where advertisement display apparatus (DA3) 211 is installed) stops at the bus stop.

At step S914, when receiving an advertisement update request message from advertisement display apparatus (DA1) 210, advertisement server 230 may select relatively optimal advertisement content to be displayed on advertisement display apparatus (DA1) 210, based on the information stored in DB 53. More specifically, advertisement server 230 may select relatively optimal advertisement content to be displayed on advertisement display apparatus (DA1) 210 among one or more advertisement contents stored in advertisement DB 533, based on at least one of (i) information included in the advertisement update request message (e.g., information on advertisement display apparatus (DA1) 210), (ii) advertisement target information which is received from advertisement target information collection apparatus (DA2) 220 of the bus stop and advertisement display apparatus (DA3) 211, and stored in advertisement target information DB 532, and (iii) traffic information, weather information, and/or event information around the bus stop.

When selecting the relatively optimal advertisement content, advertisement server 230 may use the latest information among advertisement target information received (or collected) from advertisement target information collection apparatus (DA2) 220 and advertisement display apparatus (DA3) 211. This is because waiting passengers associated with the collected advertisement target information may become audiences of the corresponding advertisement.

In accordance with another embodiment, in order to acquire accurate information on waiting passengers as advertisement audiences, advertisement target information collection apparatus (DA2) 211 having received the advertisement target information collection request message may collect advertisement target information at regular time intervals and transmit the collected advertisement target information to advertisement server 230.

Advertisement server 230 may select advertisement content being displayed by advertisement display apparatus (DA3) 211 at the current stop, as relatively optimal advertisement content for advertisement target information collection apparatus (DA2) 11.

For example, as described with reference to FIG. 7, even when advertisement server 230 selects a 'beer' advertisement based on advertisement target information and weather information, if advertisement display apparatus (DA3) 211 at the current bus stop displays the same 'beer' advertisement, advertisement server 230 may select another advertisement content associated with the 'beer' advertisement being displayed on advertisement display apparatus (DA3) 211 (e.g., another advertisement forming a series with the 'beer' advertisement being displayed on advertisement display apparatus (DA3) 211 at the current bus stop). In accordance with another embodiment, advertisement server 230 may select relatively optimal advertisement content, considering only the advertisement being displayed by advertisement display apparatus (DA3) 211.

In accordance with the present embodiment as described above, the advertisement effect for advertisement audiences may be maximized in the current advertisement markets showing the tendency to produce a series advertisement associated with the same item or service. In other words, an overlapping advertisement, which causes a reduction in the advertisement effect, may be excluded by collecting advertisement information displayed by an advertisement display apparatus of an adjacent mobile vehicles located at the same station (e.g., bus stop, platform). In addition, an associated advertisement may be displayed to further improve the advertisement effect. More specifically, the present embodiment may maximize an advertisement effect by providing a series advertisement associated with the same product/service at the same location and at the same time zone, through device-to-device (referred to as "D-to-D") communication with an adjacent mobile vehicle having an advertisement display device.

Moreover, in accordance with the present embodiment, mobile vehicles (e.g., buses) continuously arriving at the same advertisement site (e.g., a bus stop) may continuously display different advertisement contents belonging to the series advertisement, thereby improving the advertisement effect.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an advertisement service in an advertisement server in a machine to machine (M2M) system, the method comprising:

receiving, by the advertisement server, an advertisement request message from a first M2M device, wherein the first M2M device is installed in a first vehicle, and wherein advertisement request message includes at least one of identification information, current location information and travelling direction information, associated with the first vehicle;

obtaining, by the advertisement server, information on an advertisement target at an advertisement display location, wherein the obtaining includes: receiving the advertisement target information from (i) a second M2M device located at the advertisement display location and installed in a designated area, and (ii) a second advertisement display apparatus situated in a second vehicle currently located at the advertisement display location;

receiving, by the advertisement server and from the second advertisement display apparatus, information on a current advertisement content being displayed on the second advertisement display apparatus of the second vehicle currently located at the advertisement display location, wherein the current advertisement content comprises a first advertisement for a product or service;

selecting, by the advertisement server, advertisement content for display at the advertisement display location, based on the advertisement target information and the current advertisement content; and transmitting, by the advertisement server, the selected advertisement content to the first M2M device after the first vehicle enters a predetermined zone of the advertisement display location such that the transmitted advertisement content is displayed on a first advertisement display apparatus included in the first vehicle.

2. The method of claim 1, wherein the advertisement target information includes at least one of the number of advertisement audiences corresponding to the advertisement target, a gender ratio of the advertisement audiences, and an age ratio of the advertisement audiences.

3. The method of claim 1, wherein the obtaining includes:

receiving image data of the advertisement target, from the at least one of (i) the M2M device located at the advertisement display location, and (ii) the second advertisement display apparatus situated in the second vehicle located at the advertisement display location; and extracting the advertisement target information by analyzing the image data.

4. The method of claim 1, further comprising:

transmitting display control information associated with the selected advertisement content to the first M2m device.

5. The method of claim 4, wherein the display control information includes at least one of (i) display start location information (ii) the number of display repetitions, and (iii) display start time information.

6. The method of claim 1, wherein in a case that the first vehicle is a transportation vehicle, the advertisement display location is a specific station; and the advertisement target is one or more transportation service users waiting for the transportation vehicle at the specific station.

* * * * *